UNITED STATES PATENT OFFICE 2,508,226

CYANO-BUTADIENE COPOLYMERS

Albert M. Clifford and John R. Long, Stow, Ohio, assignors to Wingfoot Corporation, Wilmington, Del., a corporation of Delaware No Drawing. Application June 4, 1943, Serial No. 489,696

1 Claim. (Cl. 260—82.3)

This invention relates to polymerization products and, more particularly, to copolymers of a 2-cyano butadiene-1,3 with any of various other monomeric substances.

It has recently been found that the 2-cyano butadienes are suitable as ingredients of interpolymerized compositions, a method of preparing these cyano butadienes and certain of the cyano butadienes themselves constituting the subject matter of our copending application, Serial #314,462, filed January 18, 1940, now Patent #2,328,890, of which this application is a continuation in part. This class of polymerizable substances includes 2-cyano butadiene-1,3 and the derivatives thereof, such as those containing at least one other substituent selected from alkyl and aryl substituents. Examples are 2-methyl 3-cyano butadiene-1,3; 2-ethyl 3-cyano butadiene-1,3; 2-phenyl 3-cyano butadiene-1,3; and 4-phenyl 2-cyano butadiene-1,3.

These monomers may be prepared by treating a butanone which carries one acetoxy or a hydroxy radical with hydrogen cyanide to convert the ketone to a cyanhydrin. On acetylation of the cyanhydrin with acetic anhydride, the result in either case is a 2-cyano diacetoxy butane. This compound is then pyrolyzed at a suitable elevated temperature, say 450° to 650° C. and preferably 525° to 575° C., to split off two molecules of acetic acid and leave a butadiene which carries a nitrile substituent. The preparation of the cyanhydrin may be effected at a temperature in the neighborhood of 40° to 60° C., and the acetylation at a temperature of 100° to 120° C. Distillation of the intermediate and of the pyrolyzed product should be carried out under reduced pressure, a pressure corresponding to 10 to 60 mm. of mercury being found to be satisfactory.

Copolymers of any of the conjugated 2-cyano butadienes with various other monomers may be made by interpolymerizing the two unsaturated compounds under well known conditions. For example, the polymerization may be effected by ultra-violet radiation and in the presence or the absence of a solvent, but is preferably carried on in an emulsion. In the emulsion polymerization the aqueous medium contains an emulsifying agent and an oxidant, and a temperature between about 30° and 80° C. is maintained. Agitation is, of course, employed. Suitable emulsifiers are a commercial mixture of predominantly $C_{12}$, but containing $C_{14}$, $C_{16}$, alkyl sulphates, sodium stearate, sodium oleate, etc., and the oxidant may be sodium perborate, sodium persulphate, hydrogen peroxide, benzoyl peroxide and the like.

The 2-cyano butadiene-1,3 may be interpolymerized with butadiene-1,3 or one of its hydrocarbon derivatives, acrylonitrile or one of its alpha hydrocarbon derivatives, styrene or a substituted styrene, an alkyl ester of acrylic acid, or such an ester of an alpha hydrocarbon substituted acrylic acid, with vinyl chloride or with vinylidene chloride. Among suitable monomers may be mentioned butadiene, isoprene, acrylonitrile, methacrylonitrile, styrene and ring-substituted chlorostyrene, alkoxy styrene, vinyl chloride, vinylidene chloride, acrylic acid and methacrylic acid esters, such as ethyl acrylate, methyl methacrylate, n-butyl methacrylate, the vinyl ketones, vinyl ethers, etc.

To illustrate the process, the following examples are given, but it will be understood that the same are merely by way of illustration, and that the invention is not limited to the details thereof.

Example 1

To a mixture of 8.3 grams of butadiene and 8.3 grams of 2-methyl 3-cyano butadiene-1,3 was added 0.48 gram of $CCl_4$ and the whole was emulsified in a solution consisting of 10 cc. of 5% of a commercial mixture of sodium alkyl sulphates in which the alkyl radical has 12, 14 and 16 carbon atoms, 10 cc. of phosphate-citrate buffer (pH=7.0) and 0.113 gram of sodium perborate. This mixture was agitated at a temperature of 38° C. for a period of 68 hours, after which time the resulting latex was coagulated with alcohol and the copolymer was dried. A soft, tough and tacky rubber-like material was obtained in good yield.

Example 2

Another mixture containing 9.6 grams of butadiene, 6.4 grams of 2-cyano butadiene-1,3 and 0.48 gram of $CCl_4$ was prepared and emulsified with the same ingredients and in the same manner as set forth in Example 1 above. At the end of 48 hours at a temperature of 38° C., the polymer was precipitated with alcohol and dried. A rubber-like solid was obtained in good yield.

The monomers may be mixed in various proportions other than those illustrated in the foregoing examples; in general, it may be said that each monomer should be present to the extent of at least 20% of the total monomers, the range thus being from 20% to 80% for either constituent. Preferably, however, the conjugated 2-cyano butadiene compound should be present to the extent of 20% to 60% of the total weight of the monomers, the other monomer then being present correspondingly in amount from 80% to 40%.

Additional monomeric substances may also be interpolymerized with the cyano butadiene and the other monomer to constitute three-component systems. Also, the interpolymer resulting from the polymerization of two or more monomers may be further modified by the inclusion, either before or after polymerization of nonpolymerizable ingredients, such as plasticizers and the like. The vulcanizates obtained by curing the described substituted cyano butadiene copolymers with vulcanizing ingredients such as sulphur, are also embraced by the invention.

While there have been described above certain preferred embodiments of the invention, the latter is not limited thereto, but only by the appended claim wherein it is intended to set forth all features of patentable novelty residing in the invention.

We claim:

A copolymer of 20 to 80 percent of 2-cyano-3-methyl butadiene-1,3 and from 80 to 20 percent of butadiene-1,3.

ALBERT M. CLIFFORD.
JOHN R. LONG.

REFERENCES CITED

The following references are of record in the file of this patent:

UNITED STATES PATENTS

| Number | Name | Date |
|---|---|---|
| 2,205,239 | Carter et al. | June 18, 1940 |
| 2,284,281 | Habgood | May 26, 1942 |

FOREIGN PATENTS

| Number | Country | Date |
|---|---|---|
| 496,443 | Great Britain | Nov. 30, 1938 |